United States Patent
Bushmitch et al.

(10) Patent No.: US 6,275,471 B1
(45) Date of Patent: Aug. 14, 2001

(54) METHOD FOR RELIABLE REAL-TIME MULTIMEDIA STREAMING

(75) Inventors: Dennis Bushmitch, Summit; Sarit Mukherjee, Lawrenceville, both of NJ (US)

(73) Assignee: Panasonic Technologies, Inc., Princeton, NJ (US)

( * ) Notice: Subject to any disclaimer, the term of this patent is extended or adjusted under 35 U.S.C. 154(b) by 0 days.

(21) Appl. No.: 09/078,065

(22) Filed: May 12, 1998

(51) Int. Cl.[7] .................................................. H04J 1/16

(52) U.S. Cl. ..................... 370/248; 370/252; 370/230; 714/748

(58) Field of Search .................... 370/229, 230, 370/235, 236, 353, 389, 465, 466, 469, 473, 248, 249, 252, 352; 709/238, 239, 240; 714/746, 748

(56) References Cited

U.S. PATENT DOCUMENTS

| | | | |
|---|---|---|---|
| 5,918,020 | * 6/1999 | Blackard et al. | 395/200.58 |
| 6,006,253 | * 12/1999 | Kumar et al. | 709/204 |
| 6,031,818 | * 2/2000 | Lo et al. | 370/216 |
| 6,128,649 | * 10/2000 | Smith et al. | 709/217 |

* cited by examiner

Primary Examiner—David R. Vincent
(74) Attorney, Agent, or Firm—Harness, Dickey & Pierce, P.L.C.

(57) ABSTRACT

A method is provided for reliable real-time data streaming in a multimedia delivery system. The system is implemented using a real-time protocol that is based on the well-known Real-time Transport Protocol (RTP) suite which provides a framework for implementing near real-time reliable data delivery over non real-time unreliable data link layer technologies (e.g., Ethernet). These protocols provide near real-time reliable or best feasible data streaming while utilizing best effort unreliable network services (e.g., Internet). Under the Reliable protocol, an entire data block, including any missing or lost data packets, is reconstructed from all of the individual data packets through the use of a selective negative acknowledgement (NACK) mechanism. In contrast, the Best Feasible protocol sacrifices some of the data packet's reliability by not retransmitting "late" packets. An additional timing parameter encapsulated in the NACK message will facilitate the determination of whether it is "feasible" to retransmit a missing data packet. A real-time identification technique has been incorporated into the format of each transmitted data packet that allows for the identification of both its sender and intended recipient(s) without having to call an underlying socket specific function.

8 Claims, 9 Drawing Sheets

| V | | R Cnt | | PT = 200 | Length |
|---|---|---|---|---|---|
| SSRC of Sender | | | | | |
| NTP Timestamp | | | | | |
| RTP Timestamp | | | | | |
| Sender's Packet Count | | | | | |
| Sender's Byte Count | | | | | |
| SSRC of 1st Source (in PISA: sender itself) | | | | | |
| % Lost | Commutative Packets Lost | | | | |
| Extended Highest Seq. Number Received | | | | | |
| Interarrival Jitter | | | | | |
| Time of Last Sender Report | | | | | |
| Time Since Last Sender Report | | | | | |

RTCP Sender Report

FIG. 8

| V | | R Cnt | | PT = 201 | Length |
|---|---|---|---|---|---|
| SSRC of Sender | | | | | |
| SSRC of 1st Source (in PISA: sender itself) | | | | | |
| % Lost | Commutative Packets Lost | | | | |
| Extended Highest Seq. Number Received | | | | | |
| Interarrival Jitter | | | | | |
| Time of Last Sender Report | | | | | |
| Time Since Last Sender Report | | | | | |

RTCP Receiver Report

FIG. 9

METHOD FOR RELIABLE REAL-TIME MULTIMEDIA STREAMING

BACKGROUND AND SUMMARY OF THE INVENTION

The present invention relates generally to a method for reliable real-time multimedia streaming, and more particularly to a reliable real-time protocol for streaming data from a multimedia delivery system over a connectionless network offering best effort delivery services.

With the explosive growth of the Internet, there is a growing interest in using the Internet and other Internet protocol-based networks to deliver multimedia selections, such as video and audio material. Scalable, open-architecture multimedia systems are being used to store and retrieve multimedia data over the Internet. Interactive television, movies on demand, and other multimedia push technologies are among the more promising applications for use on these systems.

The Internet is a connectionless network offering best effort delivery service. Packets of data are routed as datagrams that carry the address of the intended recipient. A specific connection between the sender and the recipient is not required because all of host nodes on the network include the inherent capability to route datagrams from node to node until delivery is effected. This datagram packet delivery scheme is constructed as a best effort delivery system in which the delivery of datagram packets is not guaranteed.

In many cases, multimedia data requires real-time delivery. In the case of audio or video data, the data stream representing a particular media selection needs to be delivered in the proper sequence and within an abbreviated time period, to allow the user to play back the audio or video selection as it is being sent. The Real-Time Transport Protocol (RTP) is a current de facto standard for delivering real-time content over the Internet or other similar IP protocol based networks. RTP replaces the conventional transmission control protocol (TCP) and other transport layer protocols with a framework that real-time applications can use for real-time data transport. Currently, the RTP standard supports a first type of message for carrying or streaming the media content data. A separate protocol, the Real-Time Control Protocol (RTCP), is typically used in conjunction with RTP to pass control messages for session management, flow control, error correction and other system functions.

While RTP provides framework for delivering multimedia streaming data over computer networks, it does not provide reliable real-time/near real-time delivery when using best effort network services such as those provided by the Internet. The present invention solves this problem by implementing a Reliable protocol and a Best Feasible real-time protocol for streaming data across a network providing best effort unreliable network services.

Each of the real-time protocols in the present invention are based on the well-known Real-time Transport Protocol (RTP) suite which provides the framework for the implementation of near real-time reliable data delivery over non real-time unreliable data link layer technologies (e.g., Ethernet). These protocols provide near real-time reliable or best feasible data streaming while utilizing best effort unreliable network services (e.g., Internet). Under the Reliable protocol, an entire data block, including any missing or lost data packets, is reconstructed from all of the individual data packets through the use of a selective negative acknowledgement (NACK) mechanism. In contrast, the Best Feasible protocol sacrifices some of the data packet's reliability by not retransmitting "late" packets. An additional timing parameter encapsulated in the NACK message will facilitate the determination of whether it's still "feasible" to retransmit a missing data packet. A real-time identification technique has been incorporated into the format of each transmitted data packet that allows for the identification of both its sender and intended recipient(s) without having to call any underlying socket specific functions.

BRIEF DESCRIPTION OF THE DRAWINGS

FIGS. 8 and 9 are detailed format diagrams illustrating the format for Real-time Control Protocol (RTCP) sender and receiver reports, respectively.

DETAILED DESCRIPTION OF THE PREFERRED EMBODIMENT

The following description of the present invention is merely exemplary in nature and is in no way intended to limit the invention or its uses. Although specifically intended for use across a network offering best effort delivery services, such as the Internet, the real-time protocols of the present invention might also be implemented with some performance enhancement over a quality of service network. Moreover, the following description, while depicting these real-time protocols in the context of a multimedia delivery system, is intended to adequately teach one skilled in the art to implement these protocols for real-time delivery in a variety of distributed environments.

Figure 1:
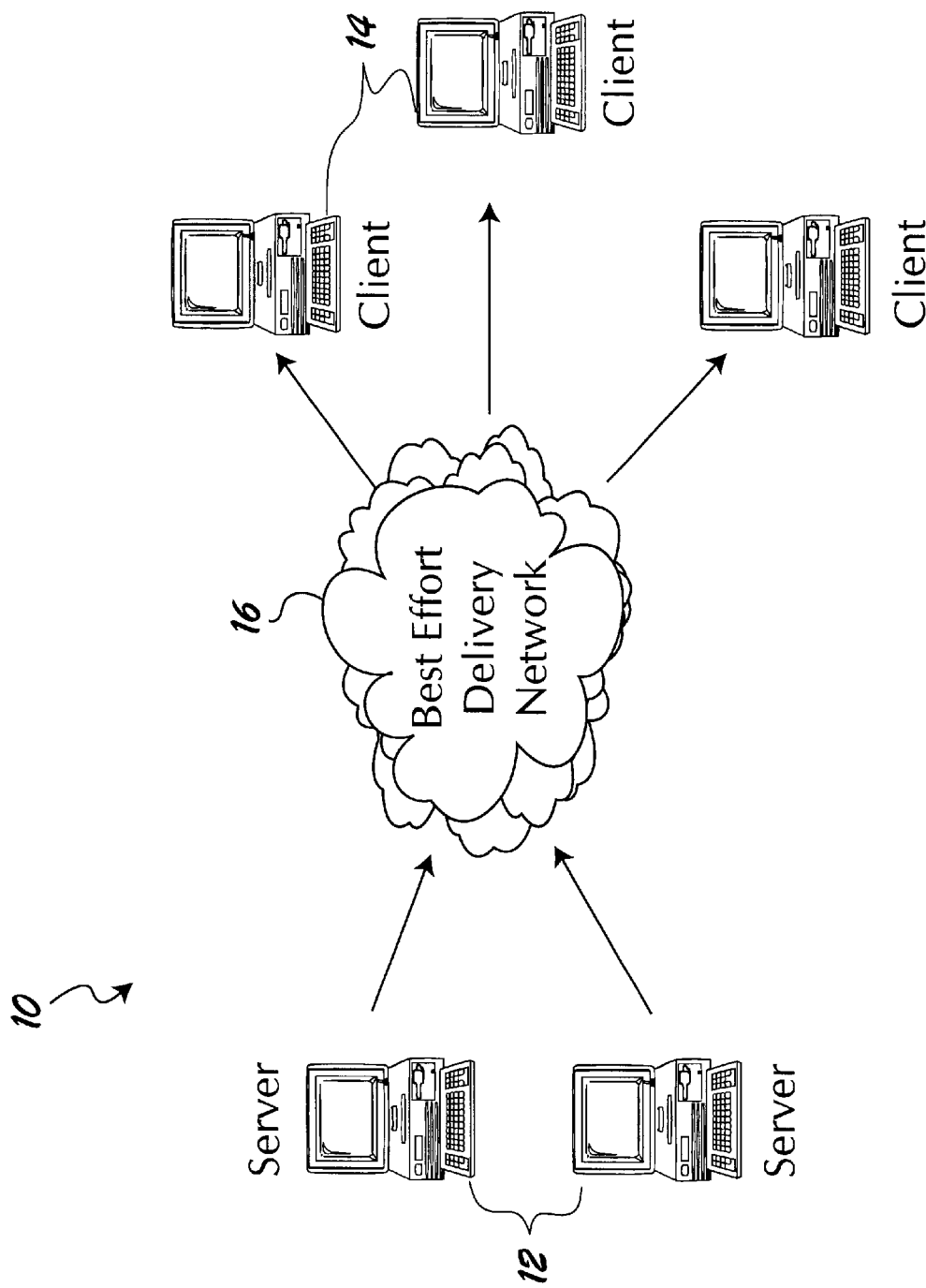
FIG. 1 is a diagram illustrating a typical distributed media delivery system.

An inexpensive and scalable multimedia delivery system 10 is depicted in FIG. 1 as having a plurality of servers 12 serving a plurality of clients 14 through a best effort network 16. Generally, multimedia delivery system 10 adopts an open standard architecture that utilizes standard hardware components. In the preferred embodiment of this architecture, the control path is separated from the data path to achieve better bandwidth utilization and a high degree of fault tolerance.

Figure 2:
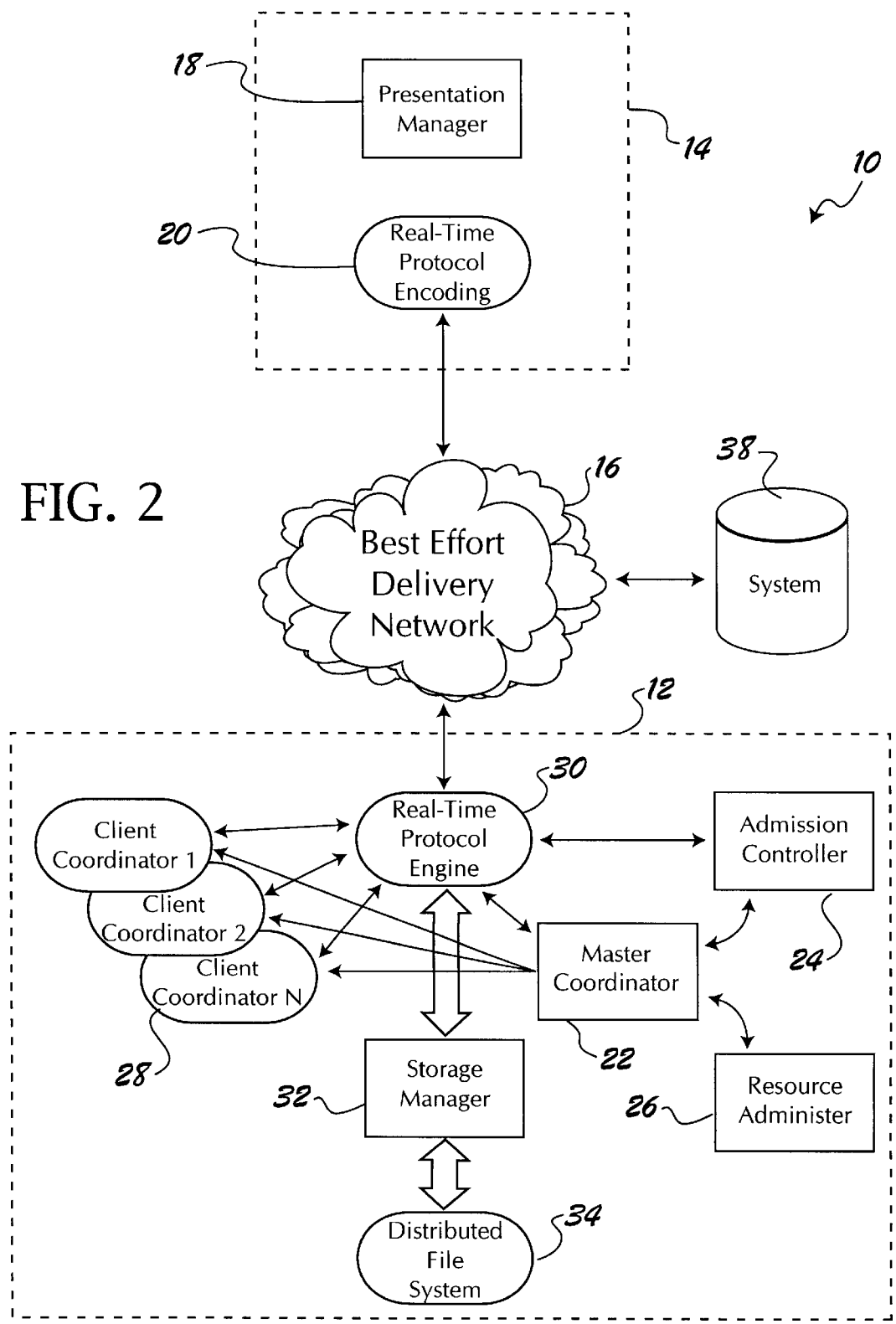
FIG. 2 is a diagram showing a software architecture for the media delivery system of the present invention.

A particular software architecture for media delivery system 10 is shown in FIG. 2. Client 14 provides a presentation manager 18 that serves as a user interface for selecting and interfacing with multimedia selections that are accessed via a real-time protocol engine 20 from server 12. Server 12 includes a master coordinator 22, an admission controller 24, a resource administrator 26, a plurality of client coordinator modules 28, a real-time protocol engine 30, a storage manager 32, and a distributed file system 34. Master coordinator 18 controls the client's entry into server 12, as well as mounts the volumes of distributed file system 34 and updates a system resource database 38 with information on available disk subsystem resources. Resource administrator 26 is responsible for monitoring different server resources, such as disk storage, disk bandwidth, network bandwidth, and CPU usage. Upon receiving a request from client 14, master coordinator 22 interrogates admission controller 24 and resource administrator 26 to determine whether to grant the client's admission request. If granted admission, master coordinator 22 creates a client coordinator that corresponds to requesting client 12. Client coordinators 28 manages all of the session procedures for a particular client. Furthermore, client coordinator 28 is responsible for accepting a client's data requests and interfacing with storage manager 32.

Storage manager 32 controls data access to a set of physical disks or other storage devices that comprise distributed file system 34. Generally, storage managers 32 do not need to reside on the same server (or host machine) as master coordinator 22 and client coordinators 28, and moreover multiple storage managers 32 can reside on the same or different physical hosts within media delivery system 10. Distributed file system 34 contains the available media selections which may be stored as a plurality of data components in one or more physical storage devices. Using this architecture, requested media selections are distributed by storage manager 32 via real-time protocol engine 30 to client 14. The above-described media delivery system and its architecture are merely exemplary and are not intended as a limitation on the broader aspects of this invention. On the contrary, the real-time protocols of the present invention may be suitably used in conjunction with other types of distributed systems.

Media delivery system 10 utilizes a set of real-time streaming protocol engines 20 and 30 which implements a real-time protocol for temporal data transmission. Each of the real-time protocols of the present invention are based on the well-known Real-time Transport Protocol (RTP) suite. RTP does not per se define a complete protocol, but rather provides a framework for implementing a real-time protocol. RTP's framework defines the basic roles, operations and message formats associated with a real-time protocol. Therefore, the real-time protocols of the present invention provide the other delivery services needed to implement a robust real-time protocol, including entity identification, session management, and reliability services. Thus, these real-time protocols are able to support near real-time reliable data delivery over a best effort unreliable network (e.g., Internet). In addition, the protocol has been designed to scale well for the large number of session participants usually found in a large-scale media delivery system.

The real-time streaming protocol of the present invention defines two distinct modes of data streaming: unicast and multicast. In unicast mode, a single RTP sender entity streams data to no more than one RTP receiver entity at a time; whereas in multicast mode, a single RTP sender entity sends data to more than one RTP receiver entity. It is also envisioned that the multicast mode could be utilized to realize multi-path real time transport and/or to implement fault tolerance functionality in a media delivery system. To implement these two modes, the present invention relies on the underlying IP unicast and IP multicast addressing schemes.

Figure 3:
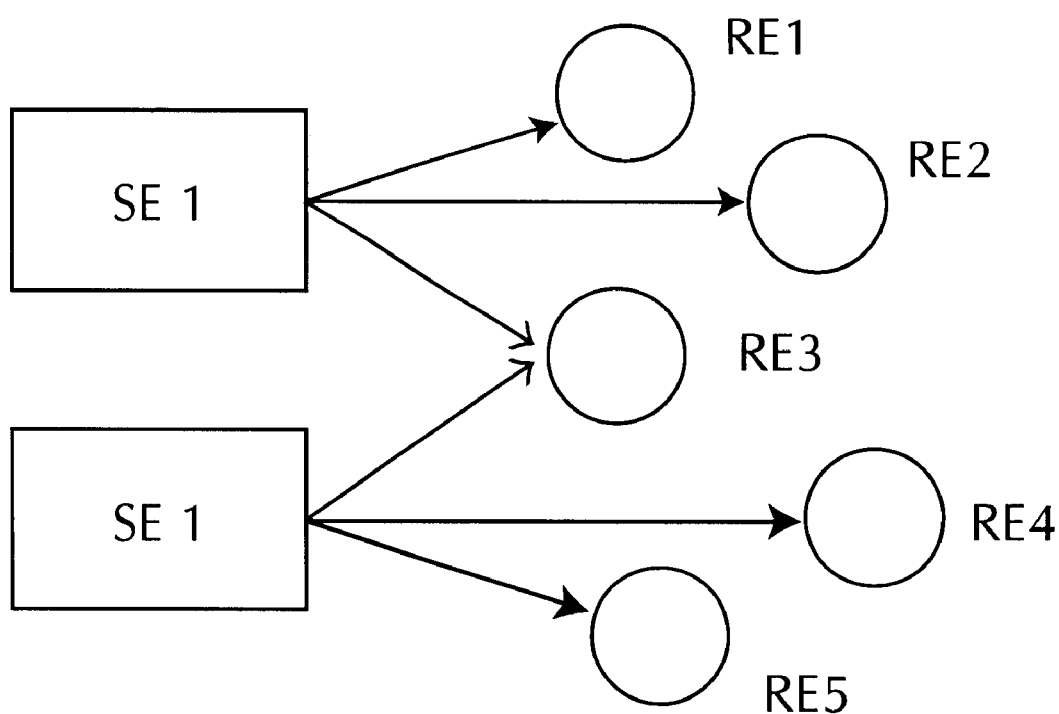
FIG. 3 illustrates multicast real-time streaming between sender entities and receiver entities in the distributed media delivery system of the present invention.

Generally, a session is an association among a set of system participants communicating with RTP. In unicast mode, the real-time protocols of the present invention define a different session for every sender-receiver pair throughout the duration of time that a given data stream is opened by a receiver entity. Thus, in FIG. 3 there are six individual sessions. Defining sessions in this manner allows a media delivery system utilizing the real-time protocols of the present invention to easily identify both the sender entity and receiver entity. In multicast mode, a session is defined for a particular sender entity (SE) and all of its corresponding receiver entities (RE) for a given broadcast. Referring to FIG. 3, a first session would be defined between SE1 and RE1, RE2, and RE3; whereas a second session would be defined between SE2 and RE3, RE4 and RE5. Since more than one sender entity is normally used in a media delivery system, the total number of sessions in a system equals the number of participating sender entities times the total number of active streams. Typically, no more than one sender of a block of data is permitted per session, although the same receiver entity can end up participating in multiple sessions (e.g., RE3 in FIG. 3).

In an RTP session, a synchronization source identifier (SSRC) only identifies session per source of data in the media delivery system. However, the real-time protocols of the present invention exerts an additional requirement on the information that the SSRC provides to the applications of the media delivery system (as further described below). To implement a session for each system participant, a unique "logical" SSRC is transmitted with each data packet that identifies both the sender and the intended recipient.

Figure 4:
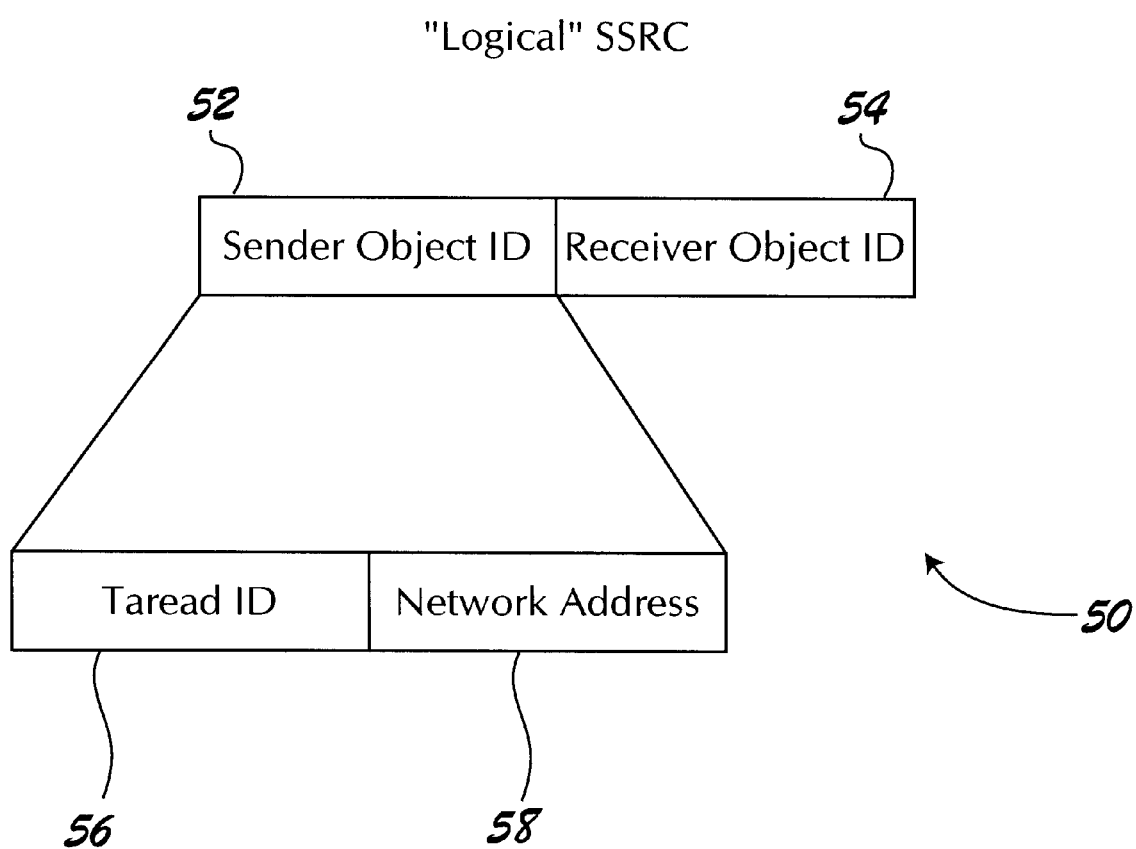
FIG. 4 is a diagram illustrating a logical SSRC identifier that defines a real-time session in a preferred embodiment of the real-time protocols of the present invention.

This "logical" SSRC is 128 bit unsigned integer. As seen in FIG. 4, the "logical" SSRC 50 is a concatenation of an Object ID 52 for the sender entity and an Object ID 54 of the receiver entity. Each instance of an application software module (i.e. object) in the media delivery system carries a unique system identifier called an Object ID, and therefore different sender entities and receiver entities have naturally distinct Object IDs. In the previously described media delivery system, each storage manger and presentation manager would have a unique Object ID. An Object ID is represented by a 64-bit unsigned integer value created by combining the host machine name 58 (i.e. IP address) with a 32-bit index of the running thread 56. Different sender entities invoked on the same host machine each have a different thread index and thus have different Object IDs. Similarly, different receiver entities on the same host will also have different Object IDs. The probability of having two or more senders in one session with an identical SSRC is extremely small, and thus no RTP mixer/translator activity shall be affected. One of the benefits of utilizing this extended "logical SSRC" is that a receiver entity can determine the Object ID of a sender entity without calling the underlying socket specific functions, thus improving efficiency in an implementation of the real-time protocols of the present invention.

Figure 5:
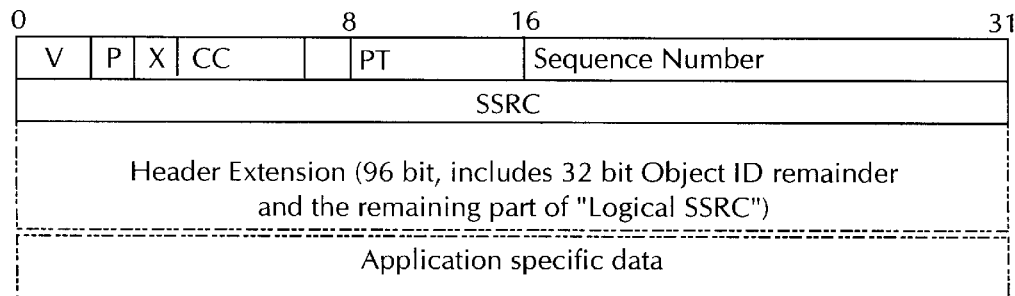
FIG. 5 is a detailed format diagram illustrating the format for a data packet according to the preferred embodiment of the real-time protocols of the present invention.

Each transmittal of a data block in a media delivery system is realized as a succession of data packets during a data block transmittal cycle. A session is called active if it is in a data block transmittal cycle. Typically, a data block is set at 1MB, but may vary for different stream types. A format for each data packet (i.e., RTP payloads) in the real-time protocols of the present invention is shown in FIG. 5. The fields in the real-time header portion of the data packet are consistent with RTP header format, including version, padding, extension, count of contributing sources (usually set at zero), payload type (set to 77), and payload sequence number. The payload sequence number will be reset at the beginning of each data block transmittal cycle. The time reference used to timestamp data packets is also reset to zero at the beginning of each cycle and incremented linearly in 1/65535 second long ticks. Data packets are in turn sent to the receiver at the rate of $1/T_{send}$, where $T_{send}$ is a programmatic parameter passed to the application's protocol communication function.

The header extension area of the data packet is used to transmit the logical SSRC. The SSRC field of the header portion contains the thread index portion (32-bit) of the Object ID for the sender entity. By setting extension field to one, the header extension area carries the remaining part of the logical SSRC. This remaining part includes the 32-bit IP address of sender entity and the Object ID (64-bit) for receiver entity which is put into the extension header of the data packet. While the above described RTP-based data packets are used for stream-specific data transmittal, application specific standard RTCP messages (as described below) are used for session management, flow control, error correction and other system functions in the media delivery system.

A media delivery system utilizing the real-time protocols of the present invention implements two types of real-time data streaming: "reliable" and "best feasible". Within an application, a reliability flag may be passed from the application layer in order to indicate which of the two approaches should be utilized by an underlying protocol engine. These two approaches are different in the way they realize the reliability constraints for data communication. The Reliable protocol attempts to reconstruct an entire data block from the individual data packets by a selective negative acknowledgement (NACK) mechanism. This reconstruction process is only bound by an Overall_Timeout parameter being passed to the application's protocol communication function, such that as long as the Overall_Timeout has not expired, the Reliable protocol will attempt to request retransmission of lost or corrupt data packets. The Overall_Timeout parameter is determined as follows:

$$\frac{D \cdot \beta}{C} + a$$

This Overall_Timeout parameter depends on the consumption rate of the receiver (C) and the amount of data (D) left in its consumption buffer and where alpha and beta are experimental determined factors. On the other hand, the Best Feasible protocol can sacrifice some of the data packet's reliability by not retransmitting "late" packets. In addition to employing a NACK mechanism, an additional timing parameter will bind the determination of "lateness" for a packet in the Best Feasible protocol.

Figure 6A:
FIG. 6A is a protocol diagram showing how a selective negative acknowledgement mechanism is used in the real-time protocols of the present invention.

Each of these real-time protocols utilize a selective negative acknowledgement mechanism. At the beginning of each data block transmittal cycle, the payload sequence number in the real-time header of the first data packet is set to zero. Based on the data block size and the size of an individual data packet (as provided in an initiation message further described below), a receiver entity can then determine how many RTP payloads to expect from the sender in a particular data block transmittal cycle. When a sender detects an "out of sequence" condition or fails to receive the last data packet, there is a programmable timeout variable ($t_{out}$) which specifies when a NACK message is to be sent to the sender. In FIG. 6A, data packets numbered 12 and 14 are received in sequence by the receiver. As a result, a NACK for data packet number 13 will be sent to the sender after $t_{out}$ second pass from the reception of data packet number 12, and in turn sender will retransmit packet number 13 to the receiver. Similarly, if there were 500 data packets to be received and only 499 arrived, then a NACK message for data packet 500 should be sent to the sender after $t_{out}$ seconds have elapsed from the reception of data packet number 499.

NACK messages are sent in unicast mode from the receiver to the sender using an application specific RTCP message. In addition to the standard RTCP header fields, a NACK message includes the following application defined fields: a missing data packet sequence number and a remaining transmission time. The remaining transmission time is the number of clock ticks (1/65536 seconds for each tick) that a receiver can wait for a successfully retransmitted packet. In the case of the Reliable protocol, the remaining transmission time value is not used and the sender always retransmits the indicated missing data packet.

In most cases, a receiver entity's application protocol communication function is called by the receiver prior to the time when the sender entity initiates data transmission. In those other rare occurrences, for example when the receiver is interrupted by some timely task of its operating system, data transmission may begin before the receiver entity is prepared to receive payloads. Therefore, each of the protocols of the present invention also incorporate special precautions to prevent a sender entity from sending RTP payloads to an unprepared receiver entity, and thereby causing unnecessary payload transmissions.

Figure 6B:
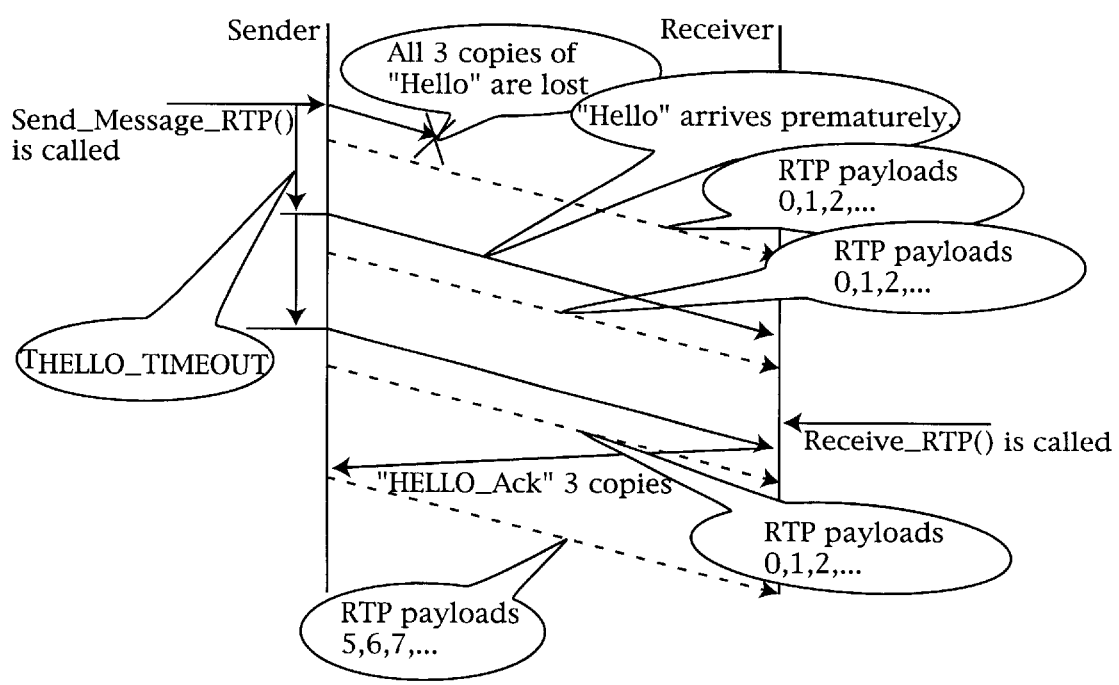
FIG. 6B is a protocol diagram showing how a handshaking scheme between a sender entity and a receiver entity at the beginning of an active transmission session is implemented in the real-time protocols of the present invention.

An example of this "handshake" scheme is shown in FIG. 6B. Sender entity will send an initiation message at the beginning of each active session period. Since these initiation messages are sent on top of an unreliable UDP protocol, preferably three identical copies of this message are sent to ensure delivery to the receiver entity. At the same time, sender entity begins sending RTP payloads to the receiver entity. Within a tunable time parameter ($t_{init\_timeout}$), sender entity expects to receive an initiation acknowledge message. Similarly, receiver entity will send three identical initiation acknowledge messages. Initiation message and initiation acknowledge message are each defined as an RTCP application specific message.

In the case where none of these acknowledge messages are received from the receiver entity within $t_{init\_timeout}$, sender entity issues another initiation message to the receiver as well as restarts the transmission process beginning with the first payload. By not waiting for the receiver's acknowledge message, this scheme improves channel utilization in the common scenario where the receiver entity was prepared to receive transmitted payloads. If a predetermined number of retransmissions is exceeded or the Overall_Timeout parameter is reached without receiving an acknowledgement, then the application's protocol communication function will report an appropriate error condition. It should also be noted that the data block size and the size of each individual data packet are encapsulated in the initiation message so that a receiver entity can then determine how many RTP payloads to expect from the sender.

Upon completion of data transmission, a termination message may optionally be sent from the receiver to the sender. For the current active session, it is preferable that the receiver entity sends at least two copies of this termination message at the time it obtains all of the necessary RTP payloads from the sender. In this way, the sender entity is more readily available to communicate with other receiver entities (rather than waiting for the expiration of various timeout parameters).

Figure 7:
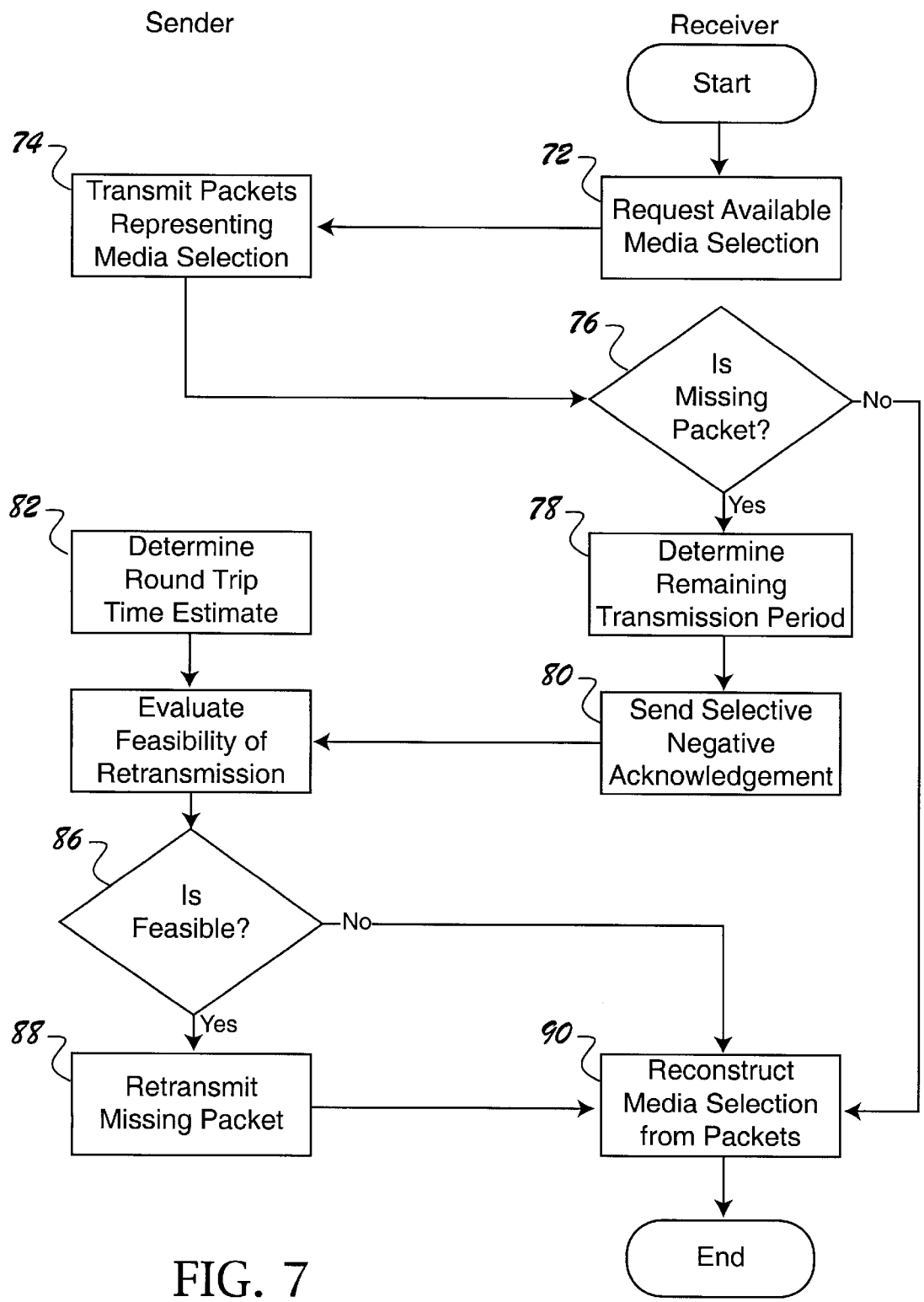
FIG. 7 is a detailed flowchart illustrating a preferred embodiment of the Best Feasible method of real-time multimedia delivery for use in a media delivery system.

In the case of the Best Feasible protocol, the sender evaluates the feasibility of retransmitting a missing packet to the receiver by using the remaining transmission time value. Referring to FIG. 7, a receiver entity requests an available media selection 72 from a sender entity. In response to this request, the sender transmits data packets 74 that represent the media selection. Decision block 76 determines when an "out of sequence" condition occurs. Assuming that at some time $\lambda$, a receiver detects a missing packet and subsequently times out waiting for that missing packet to arrive, the receiver will determine the remaining transmission time 78; otherwise the sender will reconstruct the media selection 90 using all of the received data packets. Since the receiver has a finite remaining time ($\delta$=Overall_Timeout-$\lambda$) to receive the missing payload from sender, it multiplies the remaining time $\delta$ by some experimentally determined constant $\eta$, converters it into ticks units of time and sends it along 80 to the sender via the NACK message as the remaining transmission time ($\eta\delta$).

To determine if retransmission of the missing packet is feasible 84, the sender compares an estimated Sender-Receiver round trip time (RTT) with the received remaining transmission time in decision block 86. RTT was previously determined 82 by the sender as will be described below. If the remaining transmission time exceeds RTT, then the missing packet is retransmitted in block 88; otherwise the missing packet is not present and receiver must reconstruct the media selection 90 from the available data packets. Since either the NACK message or the retransmitted data packet can be lost, there is an additional timeout variable ($T_{out\_retrans}$) set the first time the NACK is sent. After expiration of this additional timeout variable, another NACK message is generated for the same missing packet.

During the course of an RTP session, RTCP sender/receiver reports are periodically exchanged between the sender and receiver. By using this same RTCP reporting mechanism, the Best Feasible protocol of the present invention is able to determine an estimated RTT for each active receiver. FIGS. 8 and 9 illustrate the format of RTCP Sender (SNDR) report and RTCP Receiver (RCVR) report, respectively. Sender encapsulates its RTP time reference (in clock ticks) in the RTP timestamp of an RTCP sender's report. Upon reception of RTCP sender report, receiver immediately replies with an RTCP receiver report. The receiver encapsulates the received timestamp from the sender's report in the time of last sender report field of RTCP receiver report. When the sender receives this receiver's report it can easily determine how many RTP clock ticks have elapsed since the last sender's report, and therefore estimate in RTP ticks a value for RTT.

The RTT value should be statically defined outside the scope of the application's protocol communication function and available for update and immediate access during each data block transmittal cycle. This is needed since an RTT value might be required very early on in a data block transmittal cycle and potentially before any RTCP SNDR/RCVR report exchange has occurred between a particular sender and receiver. Thus, the sender's determination of possible retransmission early on in a cycle is based on the statistics from a previous data block transmittal cycle. Moreover, as defined in the present invention, more than one session could share any given pair of hosts. Due to the behavior of traditional Internet routing protocols (i.e., being fairly static in their decisions), as well as the "flat" topology of the network used by most media delivery systems, these sessions benefit by naturally sharing some networking path and its delay characteristics. As a result, RTT estimation can be shared among these sessions.

Figure 10:
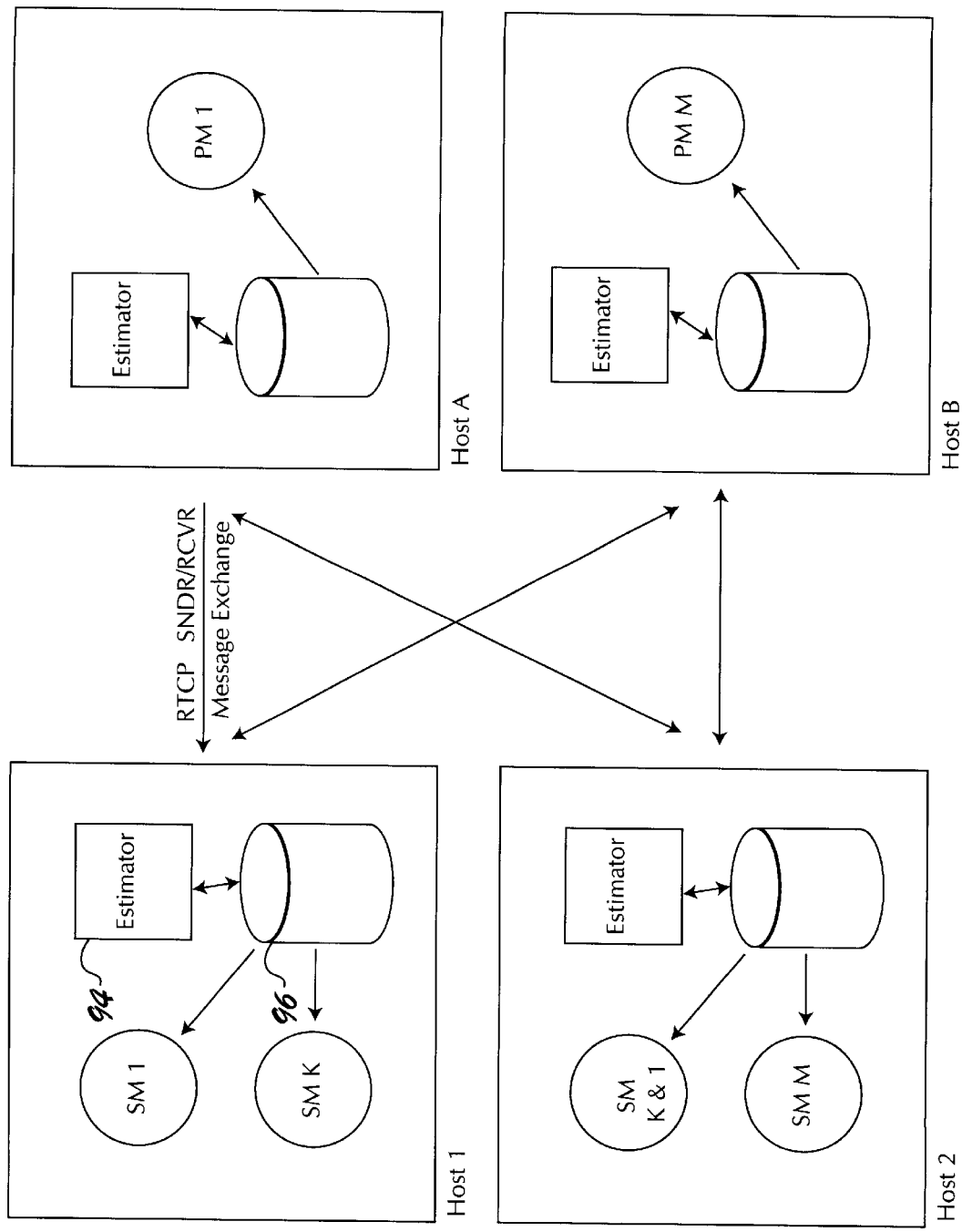
FIG. 10 is a block diagram showing an implementation for distributing an estimated round trip time (RTT) value across the media delivery system.

Referring to FIG. 10, an estimator module residing on each host in the media delivery system is responsible for maintaining RTT estimations. An estimator module 94 would contact each host on its active host list with a RTCP SNDR report message and would also respond to such requests from other host with a RTCP RCVR reply to the original sender. A reply message will encapsulate the sender timestamp as was previously explained. Estimator module 94 can then easily compute a RTT estimate for the given pair of host and put the computed value into a commonly shared data structure 96. Residing on any given host, this data structure 96 is indexed by host IP address and may include SNDR Host IP address, RCVR Host IP Address and an estimated value of RTT. Because logical SSRC encapsulates the IP address for both the sender and receiver entities, an application's protocol communication function can easily access this data structure using the indexed host IP address. Rather than maintaining RTT values for each session as suggested by RTT, this approach provides scalability by maintaining it per each pair of active hosts.

In the context of the above-described software architecture for a media delivery system, master coordinator (MC) can be responsible for adding and erasing the records in the active host list tables on all server component hosts. MC is aware of all of the active clients' IP addresses. If Storage managers are running on different hosts, a message from MC can add or delete the active host entry on other hosts. Information about the IP address of the active client is sufficient, since different server components don't require an RTT estimate among pairs of themselves. When running on the client host, estimator module 94 would start with an empty active host list table. With each SNDR RTCP request from the server's host, the client side estimator module would update its active host list table with the IP address of the host that sent the request. Entries in the data structure should be made to age and expire after some period of time.

The frequency of these RTCP SNDR/RCVR reports should be a scalable parameter which depends on the aggregate amount of data load active sessions impose on the network. Since NACK reporting can exceed 5% of total data bandwidth in cases of bad connectivity or client receiving thread "overrun", it is desirable to limit such reporting to the unicast connection that includes only the sender entity and receiver entity in question. The rest of the RTCP reporting should be done in a multicasting manner and involve all of the session participants as well as third party monitoring software. The frequency of the RTCP reporting (including RTCP SNDR/RCVR reports) should be scaled down to occupy no more than 5% of the total data bandwidth. RTCP reporting should be also strictly randomized, and thus the present invention requires that RTCP SNDR/RCVR report exchanges be randomly uniformly distributed.

The foregoing discloses and describes merely exemplary embodiments of the present invention. Although each of the real-time protocols have been described in terms of unicast mode, it is envisioned that the present invention can also be used in a multicast mode. One skilled in the art will readily recognize from such discussion, and from the accompanying drawings and claims, that other various changes, modifications and variations can be made therein without departing from the spirit and scope of the present invention.

What is claimed is:

1. A method of real-time reliable media delivery by a distributed media delivery system, said delivery system having a plurality of media servers and a plurality of media clients interconnected over a network, comprising the steps of:

initiating transmission of streaming data from a first media server to a first media client, said streaming data representing a media selection available for delivery and being stored as a plurality of substream components on said first media server;

defining a plurality of data packets by concatenating a real-time header to each of said substream components, said real-time header establishing a time relationship between each of said data packets;

determining a transmission estimate by said first media server, said transmission estimate being the transmission time for a data packet from said first media server to said first media client and back to said first media server;

transmitting said data packets across the network to said first media client;

determining a remaining transmission time by said first media client and returning a message to said first media server when said first media client fails to receive at least one of said data packets; and evaluating feasibility of retransmitting said missing data packet by said first media server in response to said message, such that said missing data packet being retransmitted to said first media client when said remaining transmission time exceeds said transmission estimate, thereby enabling said first media client to reconstruct said media selection from said data packets using said real-time header.

2. The method of claim 1 wherein said network is a connectionless network offering best effort delivery services.

3. The method of claim 1 wherein said real-time header includes a sender object identifier for said first media server and a receiver object identifier for said first media client.

4. The method of claim 3 wherein said sender identifier is further defined as a thread index and a network address for identifying one of at least two sender entities that reside on said first media server, and said receiver identifier is further defined as a thread index and a network address for identifying one of at least two receiver entities that reside on said first media client.

5. The method of claim 4 wherein a format for said real-time header is based on Real-Time Transport Protocol (RTP), such that said thread index of said sender identifier is transmitted in a synchronization source identifier field, and said network address of said sender identifier and receiver object identifier are transmitted in a header extension field.

6. The method of claim 1 wherein the media delivery system employs Real-Time Control Protocol (RTCP) for session management across the network.

7. The method of claim 6 wherein said message is as an application-specific RTCP message having a data packet sequence number for identifying said missing data packet and said remaining transmission time.

8. The method of claim 1 further comprises an estimator module residing on said first media server using RTCP sender report messages and RTCP receiver report messages to determine said transmission estimate, and a shared memory accessible to at least two sender entities residing on said first media server, said shared memory having a data structure for storing a server network address, a client network address and said transmission estimate.

* * * * *